US008812195B2

(12) United States Patent
Suzuki et al.

(10) Patent No.: US 8,812,195 B2
(45) Date of Patent: Aug. 19, 2014

(54) COLLISION SAFETY CONTROL DEVICE

(75) Inventors: Kikuo Suzuki, Kanagawa (JP); Atsushi Mikawa, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 435 days.

(21) Appl. No.: 12/385,968

(22) Filed: Apr. 24, 2009

(65) Prior Publication Data

US 2009/0210116 A1 Aug. 20, 2009

Related U.S. Application Data

(63) Continuation of application No. PCT/JP2007/069480, filed on Oct. 4, 2007.

(30) Foreign Application Priority Data

Nov. 14, 2006 (JP) .................................. 2006-307752

(51) Int. Cl.
*H02G 3/02* (2006.01)
*B60R 22/00* (2006.01)
*B60R 21/017* (2006.01)
*B60R 21/013* (2006.01)
*B60R 21/00* (2006.01)

(52) U.S. Cl.
CPC ........... *B60R 21/013* (2013.01); *B60R 21/0173* (2013.01); *B60R 2021/0023* (2013.01)
USPC ............ 701/45; 174/72 A; 361/826; 307/10.1

(58) Field of Classification Search
CPC .. B60R 21/01; B60R 21/013; B60R 21/0173; B60R 2021/01061; B60R 2021/01047; B60R 2021/01102; B60R 2021/0023; H01B 7/0045; H02G 3/00; B60K 2350/305; B64C 23/36

USPC ................. 701/45, 36, 1; 307/10.8, 9.1, 10.1; 174/72 A, 51; 361/826
See application file for complete search history.

(56) References Cited

U.S. PATENT DOCUMENTS

| 5,365,114 | A | * | 11/1994 | Tsurushima et al. | ........ 307/10.1 |
| 5,869,907 | A | * | 2/1999 | Marler | ........................ 307/10.1 |
| 6,170,864 | B1 | * | 1/2001 | Fujita et al. | .................... 280/735 |
| 7,561,445 | B2 | * | 7/2009 | Yajima et al. | ................. 361/826 |
| 2002/0081876 | A1 | * | 6/2002 | Modina | ........................... 439/92 |

(Continued)

FOREIGN PATENT DOCUMENTS

| JP | 7-161418 | 6/1995 |
| JP | 7-196004 | 8/1995 |
| JP | 2001-310692 | 11/2001 |
| JP | 2003-260992 | 9/2003 |
| JP | 2004-239115 | 8/2004 |

(Continued)

OTHER PUBLICATIONS www.explorerforum.com/forums/showthread.php?p=1308773 online discussion, referenced thread publicly available online Oct. 7, 2005, pp. 1-8.*

(Continued)

*Primary Examiner* — Christine Behncke
(74) *Attorney, Agent, or Firm* — Staas & Halsey LLP

(57) ABSTRACT

Collision safety control device having a ground wire connected to a plurality of portions of a vehicle body frame, in which two of the plurality of portions may be mutually separated by more than a width of the frame and the ground wire may include a first portion connecting the collision safety control device to the cab and a second portion connecting the cab to the frame.

1 Claim, 5 Drawing Sheets

(56) References Cited

U.S. PATENT DOCUMENTS

2005/0166882 A1* 8/2005 Suzuki et al. .............. 123/143 C
2008/0125940 A1* 5/2008 Breed ............................. 701/45
2008/0272580 A1* 11/2008 Breed ........................... 280/735

FOREIGN PATENT DOCUMENTS

JP 2006-194669 7/2006
WO 03/091074 A1 11/2003

OTHER PUBLICATIONS

Machine generated English Translation of JP07-161418A.*
Technical Manual Unit Maintenance manual for Truck, Forklift: Adverse Terrain, 10,000 LB Capacity, M544E. Published by Department of Army, Dec. 1993, pp. 1, 6-1, 6-2, and 6-166.*

Machine generated translation of JP07-161418A.*

Japanese Office Action dated Feb. 9, 2010 and issued in corresponding Japanese Patent Application 2006-307752.

International Search Report for International Application No. PCT/JP2007/069480, mailed Nov. 13, 2007.

Japanese Office Action mailed Sep. 8, 2009, issued in corresponding Japanese Patent Application 2006-307752.

Japanese Office Action for corresponding Japanese Patent Application No. 2006-307752 dated Jun. 22, 2010.

Chinese Office Action for corresponding Chinese Patent Application No. 200780042380.3 dated Feb. 1, 2011.

* cited by examiner

COLLISION SAFETY CONTROL DEVICE

CROSS-REFERENCE TO RELATED APPLICATION

This application is a continuation of International Application PCT/JP2007/69480 filed on Oct. 4, 2007, which claims priority from Japanese Application No. 2006-307752, filed Nov. 14, 2006, the contents of which are herein wholly incorporated by reference.

BACKGROUND OF THE INVENTION

1. Field of the Invention

The present invention relates to a collision safety control device, and in particular to a ground or earth wiring structure of the collision safety control device controlling actions of a collision safety equipment such as an SRS (Supplement Restraint System) airbag or a seat belt pretensioner etc.

2. Description of the Related Art

Prior art ground wiring structure of such a collision safety control device takes advantage of a cab 1 and a frame 2 in a cab over engine truck as shown in FIG. 5, in which the collision safety control device (ECU) 3 is connected to a combination switch 4 and a driver's seat airbag 5 with harness portions H1 and H2, and is further connected to a driver's seat pretensioner 6 with a harness portion H3 connected to the harness portion H1.

Also, the collision safety control device 3 is connected to a ground portion 7 secured to the frame 2 on the right side of the vehicle body (driver's seat) through the harness portion H1 and a harness portion H4 connected to the harness portion H1, where the ground portion 7 is secured to the frame 2 by a bolt and a nut.

It is to be noted that the harness portion H1 is further connected to a warning meter 18 as well as a battery terminal 9 through a harness portion H5. Another battery terminal 10 is connected to a battery ground (frame earth) 11, and that the above harness portions H1-H5 can be formed of a single harness, including therein both of a signal line from the collision safety control device 3 and a power supply line from the battery terminals 9 and 10.

The above collision safety control device 3 is activated by a power supply voltage (+24V) from the battery terminal 9, in which a sensor (not shown) reacts when the vehicle body collides with an object, so that the collision safety control device 3 responsive to an output signal of the sensor sends a drive signal to the driver's seat airbag 5 (and a front passenger's seat airbag not shown), thereby inflating the airbag immediately. Also, the collision safety control device 3 drives the driver's seat pretensioner 6 (and a front passenger's seat pretensioner not shown) when there is a high possibility of rear-end collision. The warning meter 18 is an alarm lamp for the airbag 5 or the driver's seat pretensioner 6.

There has been proposed an airbag device for automobile which houses an airbag and an inflator inside a steering wheel, in which a mechanical sensor having a weight or a bias pin made of a magnet is housed within a pad of the steering wheel, a coil is arranged around the outer periphery of a pad portion to effect a magnetic field of a coil onto the weight or the bias pin and to project a firing pin (see, e.g. Japanese patent application publication No. 7-196004).

On the other hand, there has been proposed an electrical circuit protective device which comprises a first case having a vehicle mounting portion secured to the vehicle body; a second case sectioning a storage chamber with the first case; a substrate arranged in the storage chamber and having an electrical circuit; and a connector electrically connecting the electrical circuit to external equipments, wherein the first case is made of resin, and a ground conductive path is formed of a grounding member between the substrate and the vehicle body (see, e.g. Japanese patent application publication No. 2003-260992).

[Patent Document 1] Japanese Patent Application Publication No. 7-196004

[Patent Document 2] Japanese Patent Application Publication No. 2003-260992

The prior art shown in FIG. 5 has a problem that if the harness portion H1 or H4 from the collision safety control device 3 to the ground portion 7 is disconnected at a time of offset collision etc, the collision safety control device 3 will not operate the driver's seat airbag 5.

While there is a conventional system ensuring a ground wiring redundancy by arranging a unit case of the collision safety control device 3 so as to contact with the cab 1, this system causes an incomplete contact part to arise between the unit case and the cab 1, or the cab 1 and the frame 2, so that a complete ground wiring could not be made. Also, with such an incomplete ground wiring, a controller inside the unit case can be damaged by a lightning strike.

SUMMARY OF THE INVENTION

It is accordingly an object of the present invention to provide a collision safety control device having improved reliability of airbag deployment at an offset collision or the like without providing a contact part with a cab.

In order to achieve the above-mentioned object, a collision safety control device according to the present invention features a ground wire is connected to a plurality of portions of a vehicle body frame.

Namely, according to the present invention, a ground wire of a collision safety control device for a collision safety equipment such as an airbag is ensured over a plurality of wire portions, so that even at an offset collision it becomes possible to ensure at least one ground wire portion or line will not be disconnected.

In this case, it is preferable that two of the above plurality of portions are mutually separated by more than a width of the vehicle body frame.

Furthermore, the above ground wire may include a first portion connecting from the collision safety control device to a cab and a second portion connecting from the cab to the frame.

As noted above, while the collision safety control device is required to be normally operated even when the vehicle body is damaged by a collision, the collision safety control device according to the present invention can highly improve its operation reliability by providing a plurality of ground wire portions.

Also, since it is rare that at an offset collision the frame is broken both on the right and the left sides thereof, two of the ground wire portions are mutually separated by more than the width of the frame, whereby even if one ground wire portion is disconnected at the collision, it becomes possible to securely reserve the remaining ground wire portion(s) to be used, resulting in a very low possibility of the original collision safety function being impaired.

Additionally, by connecting the ground wire separately to the cab and the frame, it becomes possible to connect the ground wire to the frame without extending a harness having a possibility of disconnection.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
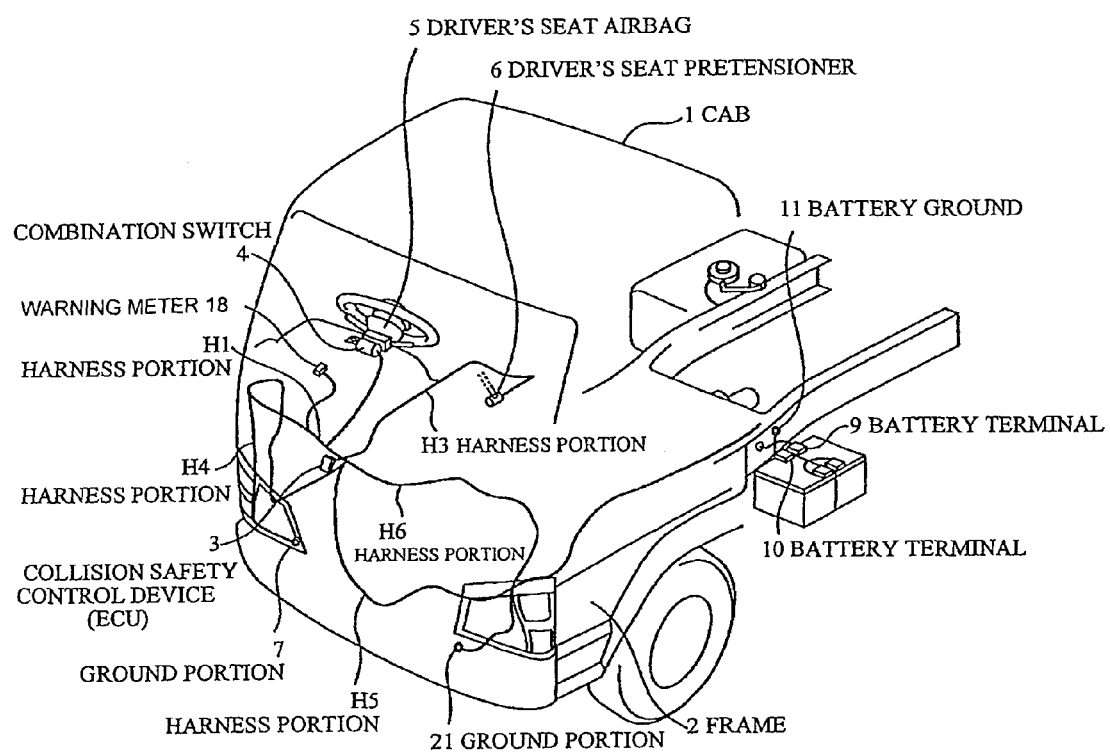
FIG. 1 is a perspective view schematically showing a ground wiring structure in an embodiment [1] of a collision safety control device according to the present invention.
Figure 2:
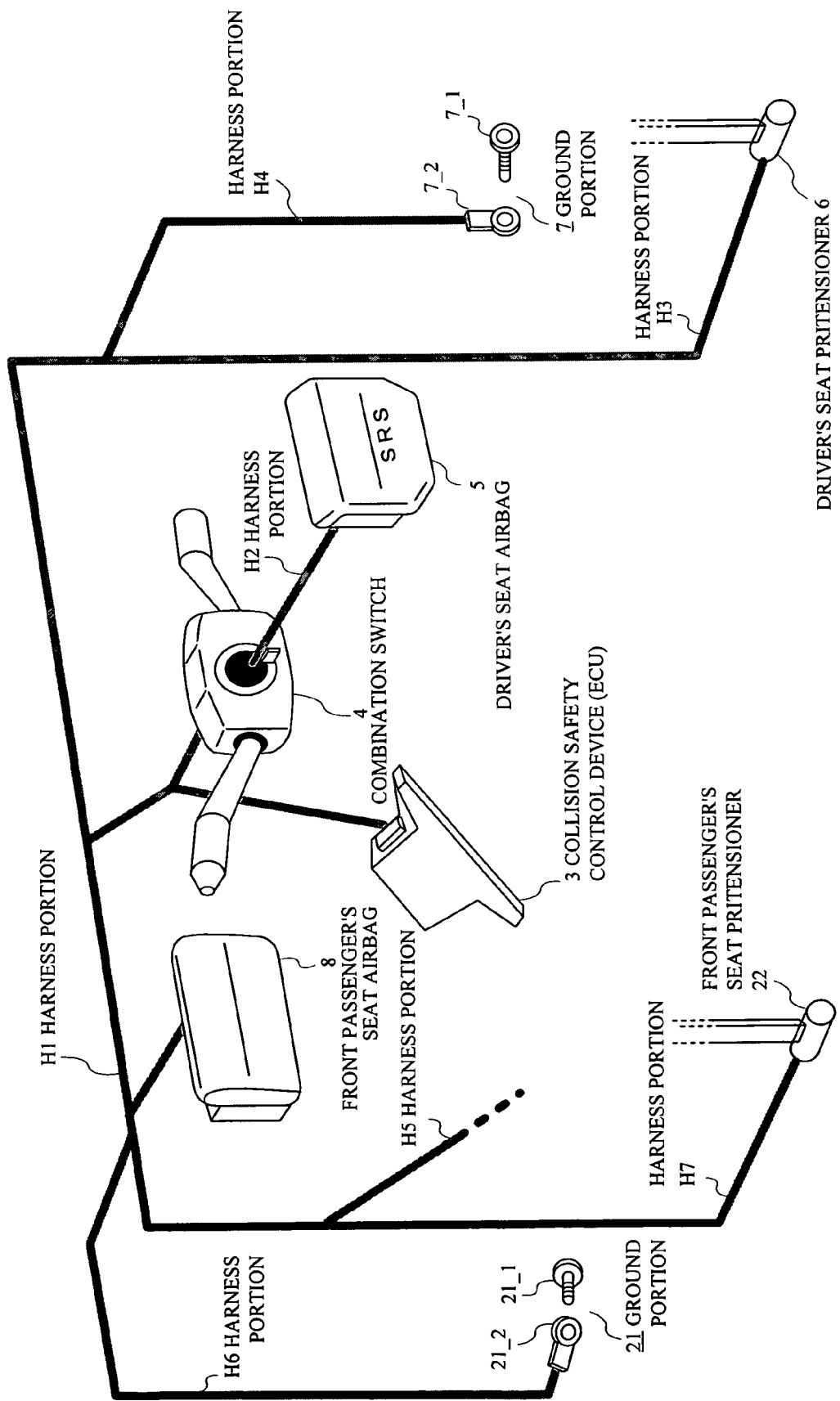
FIG. 2 is a diagram more simplified to facilitate showing a ground wiring structure of a collision safety control device according to the present invention shown in FIG. 1.
Figure 3:
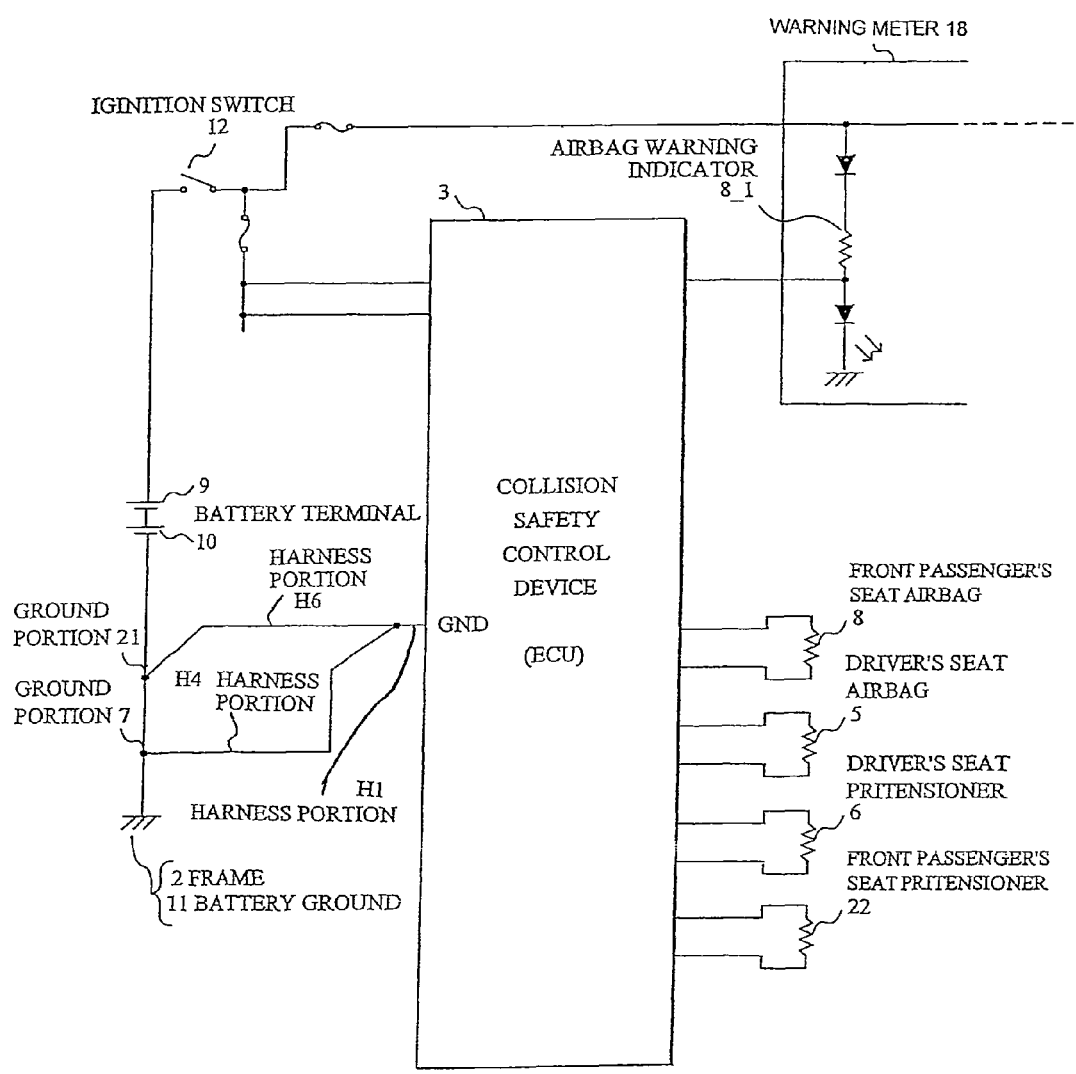
FIG. 3 is a diagram showing a circuit structure example of a collision safety control device according to the present invention shown in FIGS. 1 and 2.

Embodiment [1]: FIGS. 1-3

Figure 5:
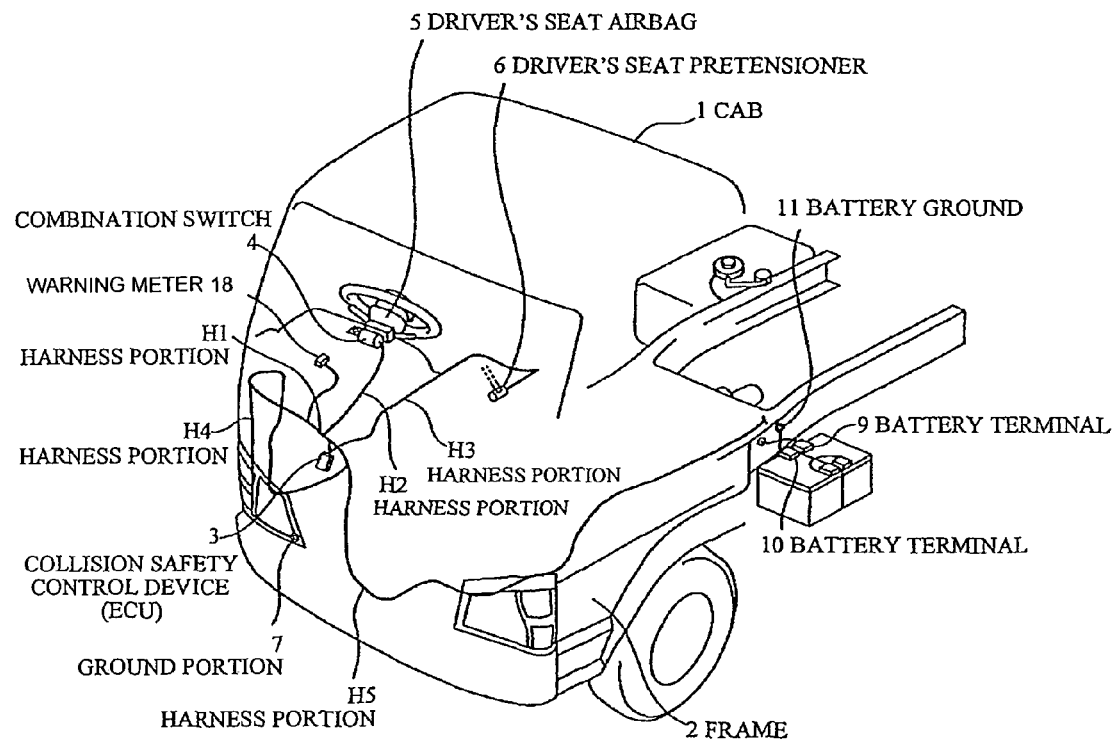
FIG. 5 is a perspective view showing a ground wiring structure of a collision safety control device as known in the art.

FIG. 1 shows a ground wiring structure in an embodiment [1] of a collision safety control device according to the present invention, which is different from the prior art shown in FIG. 5 in that a harness portion H6 is further connected to the harness portion H1 and a ground portion 21 is provided at one end of the harness portion H6 and connected to the left side (front passenger's seat side) of the vehicle body frame 2.

FIG. 2 shows conceptually in an easily understood manner a ground wiring structure in the collision safety control device of the present invention shown in FIG. 1.

Namely, the collision safety control device 3 is connected to the ground portion 7 secured to the right side of the vehicle body frame 2 with the harness portions H1 and H4 (forming a ground wire) as well as to the ground portion 21 secured to the left side of the vehicle body frame 2 with the harness portions H1 and H6 (forming a ground wire), where the ground portion 7 is secured to the frame 2 by a bolt 7_1 and a nut 7_2, and the ground portion 21 is also secured to the frame 2 by a bolt 21_1 and a nut 21_2.

It is to be noted while in FIG. 2 a front passenger's seat airbag 8 and a harness portion H7 are connected to the harness portion H1, and a front passenger's seat pretensioner 22 is connected to one end of the harness portion H7, the front passenger's seat airbag 8, the harness portion H7 and the front passenger's seat pretensioner 22 are omitted in FIG. 1.

In this case, since two ground wire portions have a possibility of a simultaneous disconnection increasing at the collision if both are mutually close, it is preferable to hold the space of both more than the width between the right and the left sides of the frame. Since the ground wire portions also have a possibility of disconnection increasing at the collision if both are long, it is preferable to pull out the ground wire portions from positions, close to the cab 1, of a harness necessary for the system.

FIG. 3 shows a circuit example of the ground wiring structure of the collision safety control device according to the present invention shown in FIGS. 1 and 2.

In this circuit example, the collision safety control device 3 is supplied with a power source (+24V) from the battery terminal 9 through an ignition switch 12, and is connected to drive a driver's seat airbag 5 and a front passenger's seat airbag 8 as well as a driver's seat pretensioner 6 and a front passenger seat pretensioner 22. A warning meter 18 is connected between an ignition switch 12 and the collision safety control device 3, and the warning meter 18 includes an airbag warning indicator 8_1.

Moreover, the collision safety control device 3 is connected to the frame 2 at the ground portions 7 and 21 respectively with two lines of the harness portions H4 and H6 forming a ground wire.

Figure 4:
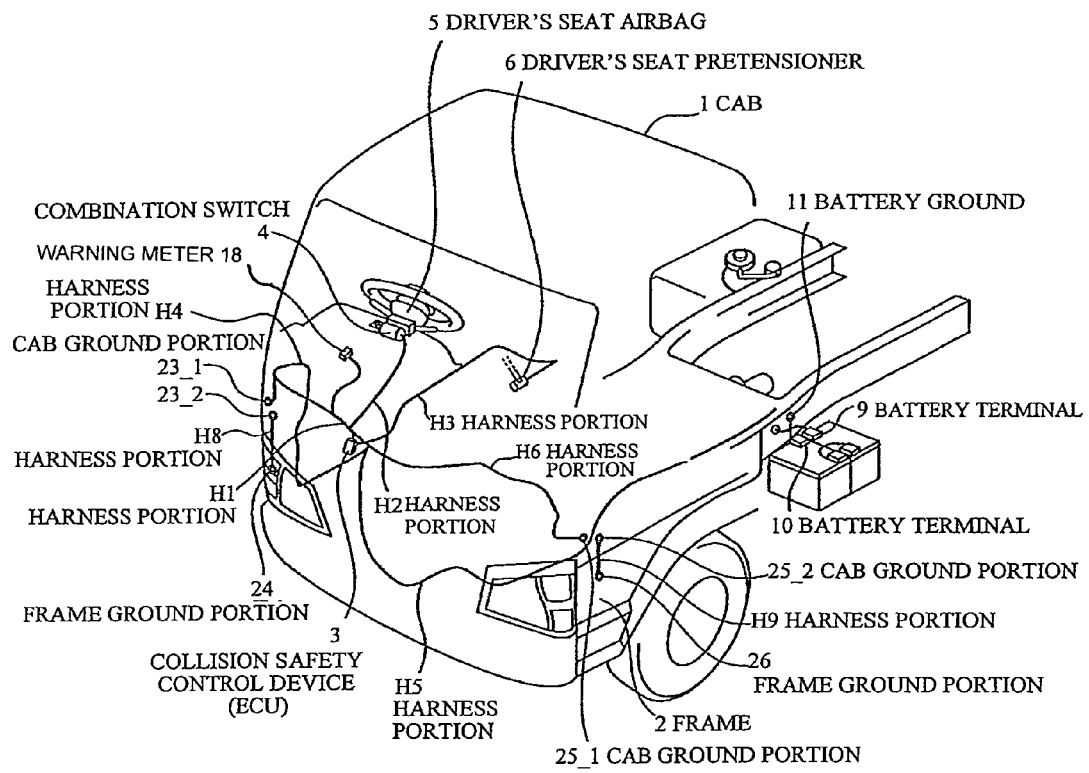
FIG. 4 is a perspective view schematically showing a ground wiring structure in an embodiment [2] of a collision safety control device according to the present invention.

Embodiment [2]: FIG. 4

FIG. 4 shows an embodiment [2] of the collision safety control device according to the present invention, wherein the ground wire, instead of being connected to the frame directly as shown in the embodiment [1] of FIG. 1, is once secured to the cab 1 and then connected to the frame 2 with separate harnesses.

Namely, on the right side of the vehicle body, the harness portion H4 is extended up to a cab ground portion 23_1, which is coupled to a cab ground portion 23_2 with a screw (bolt and nut) inside the cab 1, and is connected to a frame ground portion 24 inside the frame 2 with a harness portion H8.

Also, on the left side of the vehicle body, the harness portion H6, instead of being extended up to the frame 2 directly, is extended up to a cab ground portion 25_1 provided in the cab 1, where a cab ground portion 25_2 screwed to the cab ground portion 25_1 inside the cab 1 is connected to a frame ground portion 26 on the left side of the frame 2 with a harness portion H9 inside the frame 2.

It is also to be noted that the present invention is not limited by the above-mentioned embodiments, and it is obvious that various modifications may be made by one skilled in the art based on the recitation of the claims.

The invention claimed is:

1. A collision safety control device of a vehicle comprising:
first and second harness portions, first and second cab ground portions mutually connected through a cab of the vehicle, and a first frame ground portion in a first portion of a frame of the vehicle on a driver's seat side,
third and fourth harness portions, third and fourth cab ground portions mutually connected through the cab, and a second frame ground portion in a second portion of the frame on a passenger's seat side; wherein:
a fifth harness portion is connected to the first and the third harness portions and to the collision safety control device,
the first harness portion is connected to the cab at the first cab ground portion,
the second harness portion is connected to the cab at the second cab ground portion and to the first portion of the frame at the first frame ground portion,
the third harness portion is connected to the cab at the third cab ground portion,
the fourth harness portion is connected to the cab at the fourth cab ground portion and to the second portion of the frame at the second frame ground portion
the first, the second and the fifth harness portions form a first ground line from the collision safety control device to the first portion of the frame,
the third, the fourth and the fifth harness portions form a second ground line from the collision safety control device to the second portion of the frame,
the first portion of the frame and the second portion of the frame are separated by a first width, and the first ground line and the second ground line are mutually separated by a second width that is greater than the first width.

\* \* \* \* \*